(12) United States Patent
An

(10) Patent No.: US 10,580,351 B2
(45) Date of Patent: Mar. 3, 2020

(54) MICRO LIGHT-EMITTING DIODE DISPLAY DEVICE AND DISPLAY DEVICE

(71) Applicant: LG Display Co., Ltd., Seoul (KR)

(72) Inventor: Chunghwan An, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/049,188

(22) Filed: Jul. 30, 2018

(65) Prior Publication Data

US 2019/0189049 A1 Jun. 20, 2019

(30) Foreign Application Priority Data

Dec. 20, 2017 (KR) .................. 10-2017-0176452

(51) Int. Cl.
*G09G 3/32* (2016.01)
*G09G 3/20* (2006.01)
*G06T 7/90* (2017.01)

(52) U.S. Cl.
CPC ............. *G09G 3/32* (2013.01); *G06T 7/90* (2017.01); *G09G 3/2003* (2013.01); *G06T 2207/10024* (2013.01); *G09G 2320/066* (2013.01); *G09G 2320/0626* (2013.01); *G09G 2320/0666* (2013.01); *G09G 2320/0686* (2013.01)

(58) Field of Classification Search
CPC ............ G06T 2207/10024; G06T 7/90; G09G 2320/0626
See application file for complete search history.

(56) References Cited

U.S. PATENT DOCUMENTS

| | | | |
|---|---|---|---|
| 8,791,474 B1* | 7/2014 | Bibl ..................... | G09G 3/2003 257/100 |
| 2005/0162737 A1* | 7/2005 | Whitehead ........... | H04N 9/3102 359/454 |
| 2017/0025075 A1* | 1/2017 | Cok ........................ | G09G 3/32 |

* cited by examiner

*Primary Examiner* — Chun-Nan Lin
(74) *Attorney, Agent, or Firm* — Morgan, Lewis & Bockius LLP

(57) ABSTRACT

A micro LED display device includes a display panel. The display panel includes a plurality of pixel areas each having a thin film transistor. A first micro LED and a second micro LED are in each pixel area. The first micro LED is configured to emit light to display an image, and the second micro LED is configured to emit light to improve a displayed brightness for a specific area of the image.

12 Claims, 9 Drawing Sheets

MICRO LIGHT-EMITTING DIODE DISPLAY DEVICE AND DISPLAY DEVICE

CROSS-REFERENCE TO RELATED APPLICATION

This application claims priority to and the benefit of Korean Patent Application No. 10-2017-0176452, filed on Dec. 20, 2017, the disclosure of which is incorporated herein by reference in its entirety.

BACKGROUND

Technical Field

The present disclosure relates to a micro light-emitting diode (LED) display device having a redundancy micro LED and a method of driving the same.

Discussion of the Related Art

Since an organic electroluminescent device using poly (p-phenylenevinylene) (PPV), which is one of the conjugate polymers, has been developed, research on the organic materials such as the conjugate polymers having conductivity has been actively conducted. Research for applying such organic materials to thin film transistors (TFTs), sensors, lasers, photoelectric elements, etc., is continuing to be pursued, as is research on an organic electroluminescent display device.

In the case of an electroluminescent device composed of a phosphor-type inorganic material, because an AC voltage of 200 V or more may be required for operation and a manufacturing process of a such a device may be made by a vacuum deposition, there may be disadvantages such as it being difficult to increase a size of the device. Furthermore, it may be difficult to achieve a blue luminescence. In addition, manufacturing cost may be high.

However, an electroluminescent device made of an organic material may have advantages such as an excellent luminescent efficiency, the ability to make a large-sized device, a simple manufacturing process, and blue luminescence. Furthermore, such a device has been spotlighted as a next generation display device that can be bent.

Currently, an active matrix organic electroluminescent display device having an active driving element in each pixel has been actively studied as a flat panel display like a liquid crystal display device.

However, such an organic electroluminescent display device may have the following problems.

In general, an organic electroluminescent display device uses a fine metal shadow mask to deposit an organic luminescent layer on a substrate. However, a process using such a metal shadow mask may have a limitation in forming a large area organic electroluminescent display device. In addition, in the case of a high resolution display device, the metal shadow mask must be manufactured with high resolution, but there may be limitations to manufacturing such a metal shadow mask.

In order to solve such problems, an organic electroluminescent display device in which a white luminescent device and a color filter are combined has been proposed. In such a white organic electroluminescent display device, there may be advantages including that a used amount of the organic material is small, a process time is short, a yield is high, and a cost is reduced. However, in the white organic electroluminescent display device, a brightness may be lowered due to a light absorption by the color filter, and the color purities may be lowered. In addition, there is still a limit to manufacturing a large-sized display device.

SUMMARY

Accordingly, the present disclosure is directed to a micro LED display device that substantially obviates one or more problems due to limitations and disadvantages of the related art.

It is an object of the present disclosure to provide a micro LED display device having a micro LED.

It is another object of the present disclosure to provide a micro LED display device capable of preventing a degradation of an image quality due to a defective pixel by providing a redundancy micro LED and embodying realistically a HDR (High Dynamic Range) image by further driving a redundancy micro LED, and a driving method thereof.

Additional features and advantages of the disclosure will be set forth in the description which follows, and in part will be apparent from the description, or may be learned by practice of the disclosure. The objectives and other advantages of the disclosure will be realized and attained by the structure particularly pointed out in the written description and claims hereof as well as the appended drawings.

To achieve these and other advantages and in accordance with the purpose of the disclosure, as embodied and broadly described herein, there is provided a micro LED display device comprising a display panel including a plurality of pixel areas each having a thin film transistor, and a first micro LED and a second micro LED in each pixel area, wherein the first micro LED is configured to emit light to display an image, and the second micro LED is configured to emit light to improve a displayed brightness for a specific area of the image.

In another aspect, a display device comprises a display panel including a plurality of pixel areas, wherein each pixel area includes a first LED and a second LED, and wherein the display device is configured to drive the second LED to emit light based on the first LED being defective.

In the present disclosure, a micro LED composed of an inorganic material is transferred on a large area substrate to manufacture a display device, so that a large area display device having a high brightness, a long life, and a low unit cost can be easily manufactured.

In addition, in the present disclosure, a main luminescent micro LED and a redundancy micro LED are arranged in one pixel area, and when the pixel area is defective, the redundancy micro LED is driven to repair the defective pixel.

Also, in the present disclosure, the main luminescent micro LED is driven to display an image, and in a specific area such as the dynamic range extended area, a redundancy micro LED is further driven other than the main luminescent micro LED, thereby greatly improving the brightness and contrast ratio of the corresponding area and the HDR image can be embodied close to an image of a real object.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principles of the disclosure. In the drawings.

DETAILED DESCRIPTION OF THE DISCLOSURE

Figure 1:
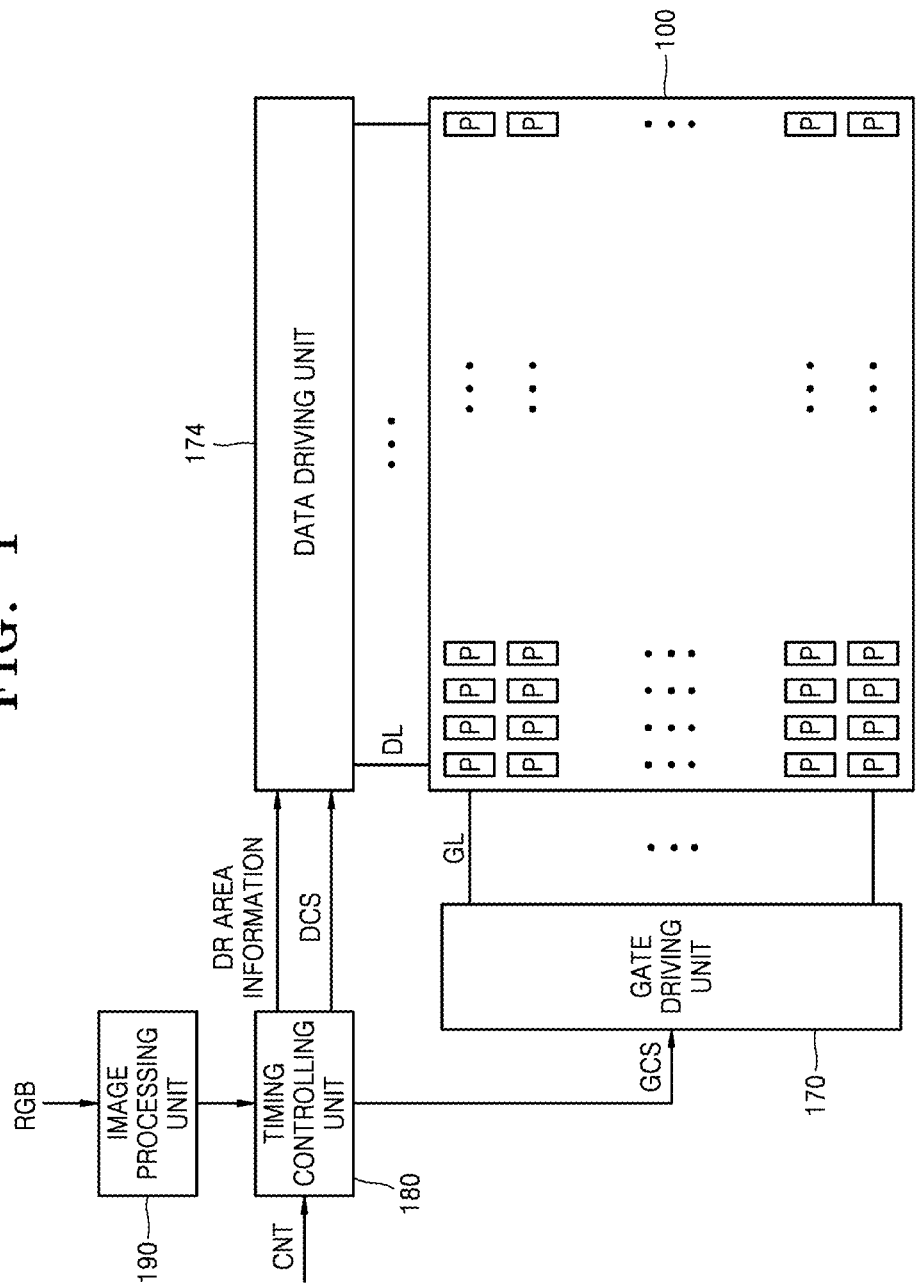
FIG. 1 is a view schematically illustrating a micro LED display device in accordance with an example embodiment of the present disclosure.

Reference will now be made in detail to the embodiments of the present disclosure, examples of which are illustrated in the accompanying drawings.

The advantages and the features of the present disclosure and the method of achieving them will become apparent with reference to the embodiments described in detail below together with the accompanying drawings. The present disclosure may, however, be embodied in many different forms and should not be limited to the embodiments disclosed below. Rather, these embodiments are provided so that this disclosure of the present disclosure will be complete, and will fully convey the scope of the disclosure to those skilled in the art to which the preset disclosure pertains, and the present disclosure is merely defined by the scope of claims.

The shapes, the sizes, the ratios, the angles, the numbers, etc., disclosed in the drawings for describing the embodiments of the present disclosure are illustrative of examples, and thus, the present disclosure is not limited to the illustrated matters. Like reference numerals refer to like elements throughout the specification. In addition, in describing the present disclosure, when it is determined that a specific description with regard to the related known technology may interrupt the gist of the present disclosure unnecessarily, the detailed description thereof may be omitted. In the case where "includes," "has," "composed of," etc., are used in the present specification, other parts may be added unless otherwise specified with a word like "only." When the component is expressed as the singular, and there is no explicit description, it includes the case of including the plural.

In interpreting the components, it is construed to include an error range even if there is no separate explicit description.

In the case of a description of a positional relationship, for example, when the positional relationship between two parts is described as "on~," "in an upper part~," "in a lower part~," or "next~," unless otherwise specified with a word like "immediately" or "directly," one or more other parts may be disposed between two parts.

In the case of a description of a temporal relationship, for example, if a temporal order relationship is described by "after~," "following~," "subsequently~," "before~," etc., unless otherwise specified with a word like "immediately" or "directly," the case which is not continuous may be also included.

The first, second, etc., are used to describe various components, but these components are not limited by these terms. These terms are merely used to distinguish one component from another component. Therefore, the first component mentioned below may be the second component within the technical spirit of the present disclosure.

Each of the features of the various embodiments of the present disclosure may be coupled or combined with each other, partially or entirely, and technically various connections and drivings are possible, and the embodiments may be provided independently of each other, and can be provided in an associative relation.

Hereinafter, the present disclosure will be described in detail with reference to the accompanying drawings.

FIG. 1 is a view illustrating a micro LED display device in accordance with an example embodiment of the present disclosure.

As shown in FIG. 1, a micro LED display device includes a micro LED display panel 100 and a panel driving unit for driving the micro LED display panel 110.

Although not shown in the figure, the micro LED display panel 100 includes a plurality of pixels P defined by a plurality of gate lines and data lines, and each pixel includes a thin film transistor and red (R), green (G), and blue (B) micro LEDs.

The panel driving unit includes a gate driving unit 170, a data driving unit 174, a timing controlling unit 180, and an image processing unit 190.

The gate driving unit 170 generates a gate signal according to a gate control signal GCS supplied from the timing controlling unit 180 and sequentially outputs the generated gate signal to the gate line of the display panel 100.

The data driving unit 174 generates a data signal from an externally input image data RGB according to a data control signal DCS supplied from the timing controlling unit 180 and outputs the generated data signal to the data line DL of the display panel 100. The data driving unit 174 receives a plurality of reference gamma voltages from a gamma voltage supplier (not shown), and converts the image data RGB into a data signal in an analog form using a plurality of reference gamma voltages, and outputs it to a database.

The timing controlling unit 180 generates a gate control signal GCS and a data control signal DCS according to a control signal CNT input from an external system (not shown). The gate control signal GCS includes a gate start pulse GSP, a gate shift clock GSC, and an output enable signal GOE, etc., and is supplied to the gate driving unit 170. The data control signal DCS includes a source start pulse SSP, a source sampling clock SSC, an output enable signal SOE, a polarity control signal POL, etc., and is supplied to the data driving unit 174.

The timing controlling unit 180 outputs the image data RGB' processed in the image processing unit 190 to the data driving unit 174.

The image processing unit 190 analyzes the format of the image data RGB input from the outside and analyzes whether the image is a SDR (Standard Dynamic Range) image or a HDR (High Dynamic Range) image, processes the image according to the format of the analyzed image, and simultaneously sets an extended area of a dynamic range to supply it to the timing controlling unit 180.

The timing controlling unit 180 increases the brightness of the corresponding area according to the DR extended area information input from the image processing unit 190, thereby realizing an image close to a real image.

Figure 2:
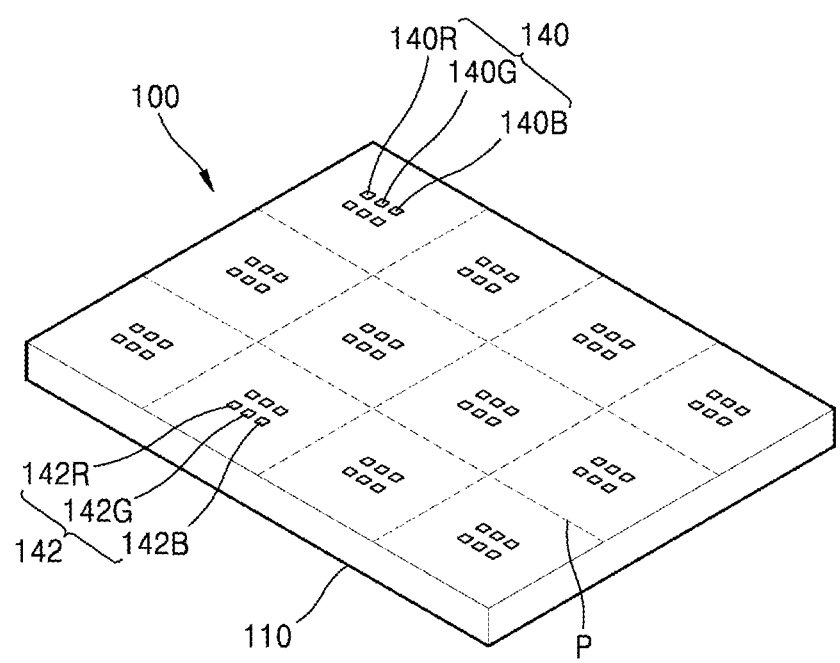
FIG. 2 is a perspective view schematically illustrating a micro LED display panel in accordance with an example embodiment of the present disclosure.

FIG. 2 is a plan view schematically illustrating a micro LED display panel 100 in accordance with an example embodiment of the present disclosure.

As shown in FIG. 2, the micro LED display panel 100 includes a substrate 110, a plurality of first micro LEDs 140 and a plurality of second micro LEDs 142 mounted on the substrate 110.

The substrate 110 may be composed of a transparent material such as glass, and a plurality of pixel areas P are formed on the substrate. Although not shown in the figure, the substrate 110 is a TFT array substrate, and various wirings and a thin film transistor for driving the first micro LED 140 and the second micro LED 142 are formed in a pixel area P in an upper surface thereof. As an example, when the thin film transistor is turned on, a driving signal input from the outside through the wiring is applied to the micro LED 140, and the micro LED 140 is luminescent to realize an image.

The first micro LED 140 arranged in the pixel area P is composed of R, G, and B micro LEDs 140R, 140G, and 140B and the second micro LED 142 is also composed of R, G, and B LEDs 142R, 142G, 142B.

The first micro LED 140 is a main luminescent micro LED and emits light of R, G, and B colors respectively from the micro LEDs 140R, 140G, and 140B for R, G, and B to display an image as the signal is applied from outside. The second micro LED 142 is a redundancy micro LED and may operate instead of the first micro LED 140 when a defect occurs in the first micro LED 140 of a specific pixel. Although not shown in the drawings, a gate line, a data line, and a thin film transistor for realizing the first micro LED 140 are formed in the pixel area of each micro LED display panel 100, as well as a separate redundancy gate line, a redundancy data line, and a redundancy thin film transistor for driving the second micro LED 142. In other words, the first micro LED 140 and the second micro LED 142 operate separately by a different thin film transistor from each other driven by a signal input through a different path from each other.

The first micro LED 140 and the second micro LED 142 are formed in the same structure and have the same optical and electrical properties, and are manufactured by a process separate from a TFT array process of the substrate 110. In a general organic electroluminescent display device, both the TFT array process and the organic luminescent layer are formed by a photo process. In contrast, in the micro LED display device of the present disclosure, the thin film transistor and various wirings arranged on the substrate 110 may be formed by a photo process, while the first micro LED 140 and the second micro LED 142 are manufactured by a separate process. The first micro LED 140 and the second micro LED 142 manufactured separately are transferred on the substrate 110. Thus, the micro LED display device is manufactured.

As such, in the micro LED display device of the present disclosure, the first micro LED 140 and the second micro LED 142 for redundancy may be arranged in one pixel area P, as discussed below.

In the micro LED display device, the micro LEDs 140 and 142 are manufactured separately from the process of the TFT array substrate 110, that is, the TFT, and then transferred to the display panel 100. Therefore, there may be no way to repair the defective micro LED 140 when a defect is generated in the micro LED 140. Of course, it may be possible to exchange the micro LED 140 at a specific point where the defect occurs with a normal micro LED, but it may not be possible to remove the fine size of the micro LED 140 from the display panel 100 and transfer another micro LED 140 at this position again.

Therefore, in the present disclosure, the redundancy micro LED 142 may be provided separately from the main luminescent micro LED 140 so that when a defect is generated in the main luminescent micro LED 140, a signal is not applied to the defective micro LED 140 and is instead applied to the corresponding redundancy micro LED 142, thereby preventing an image quality degradation due to the defective micro LED 140.

On the other hand, the micro LEDs 140 and 142 may have a size of 10-100 μm, and may be formed by thin film growing a plurality of the organic materials such as Al, Ga, N, P, As, In, etc., on a sapphire substrate or a silicon substrate, and cutting and separating the sapphire substrate or the silicon substrate. As such, because the micro LEDs 140 and 142 are formed in a fine size, they may be transferred to a flexible substrate such as a plastic, and a flexible display device can be manufactured. In addition, unlike the organic luminescent layer, the micro LED 140 may be formed by thin film growing an inorganic material, so that the manufacturing process is simple and the yield is improved. In addition, because the micro-LEDs 140 and 142 separated from each other can be simply transferred onto the large area substrate 110, a large area display device may be manufactured. Further, the micro LEDs 140 and 142 made of an inorganic material may have advantages such as a high brightness, long life, and low unit cost compared to the LED manufactured with the organic luminescent material.

Figure 3:
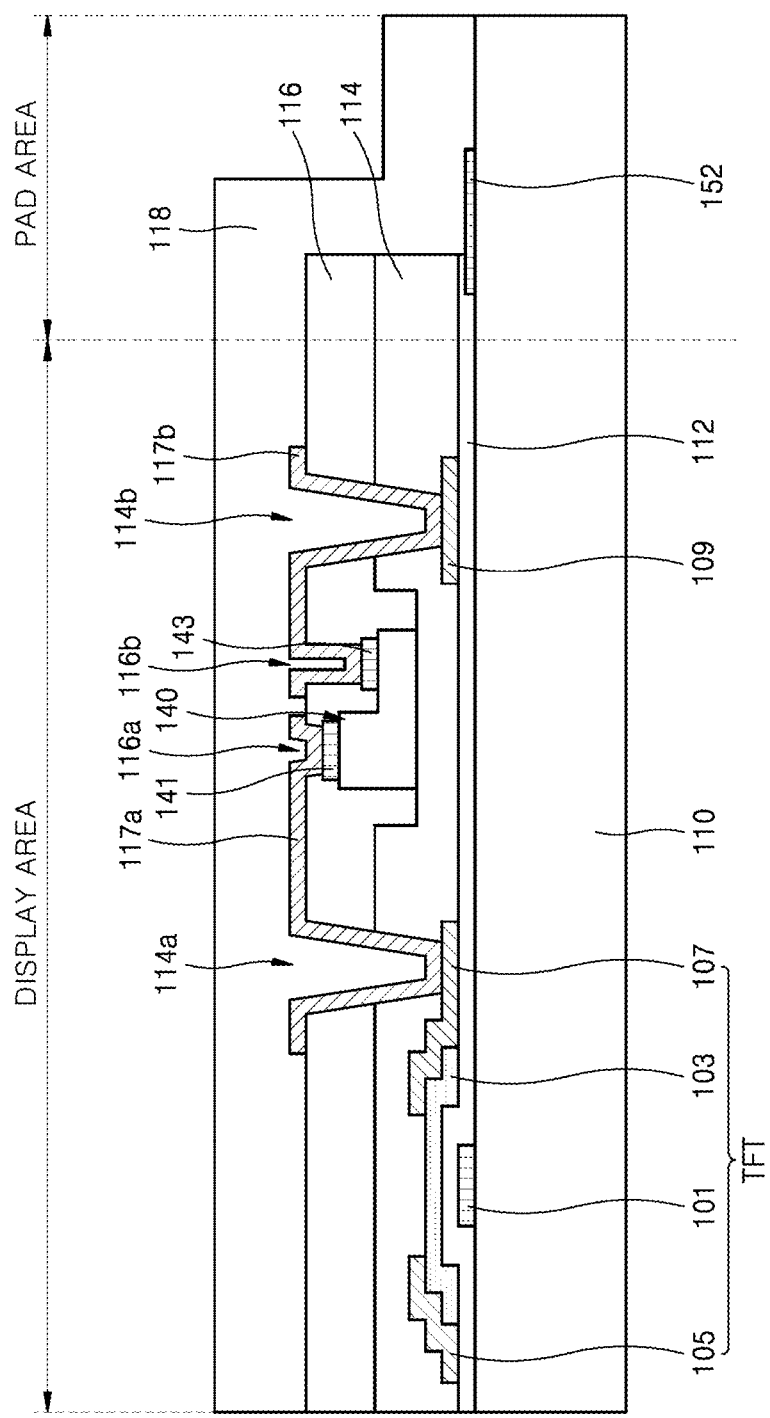
FIG. 3 is a cross-sectional view illustrating a structure of a micro LED display panel in accordance with an example embodiment of the present disclosure.

FIG. 3 is a cross-sectional view specifically illustrating a structure of a micro LED display device 100 in accordance with an example embodiment of the present disclosure. At this time, the first micro LED 140 and the second micro LED 142 have the same structure. Also, the respective pixel areas P of the display panel 100, to which the first micro LED 140 and the second micro LED 142 are transferred, have the same structure. Thus, a structure in which only the first micro LED 140 is transferred is described for convenience of explanation.

As shown in FIG. 3, a thin film transistor (TFT) is arranged in a display area of the substrate 110, and a pad 152 is arranged in a pad area. The substrate 110 is composed of a transparent material such as glass, but it is not limited thereto and may be composed of various transparent materials. In addition, the substrate 110 may be composed of a flexible transparent material.

The thin film transistor TFT includes a gate electrode 101 formed on a substrate 110, a gate insulating layer 112 formed over an entire area of the substrate 110 and covering the gate electrode 101, a semiconductor layer 103 formed on the gate insulating layer 112, and a source electrode 105 and a drain electrode 107 formed on the semiconductor layer 112.

The gate electrode 101 may be formed of a metal such as Cr, Mo, Ta, Cu, Ti, Al, an Al alloy, or an alloy thereof. The gate insulating layer 112 may be made of a single layer of inorganic insulating materials, such as SiOx or SiNx, or a plurality of layers made of SiOx and SiNx.

The semiconductor layer 103 may be composed of an amorphous semiconductor, such as amorphous silicon. It may be composed of an oxide semiconductor, such as IGZO (Indium Gallium Zinc Oxide), $TiO_2$, ZnO, $WO_3$, or $SnO_2$. When the semiconductor layer 103 is formed of an oxide semiconductor, the size of the thin film transistor (TFT) may be reduced, a driving power may be reduced, and an electric mobility may be improved. In the present disclosure, the semiconductor layer of the thin film transistor is not limited to a specific material, but all types of semiconductor materials currently used in thin film transistors may be used.

The source electrode 105 and the drain electrode 107 may be made of a metal such as Cr, Mo, Ta, Cu, Ti, Al, an Al alloy, or an alloy thereof. At this time, the drain electrode 107 acts as a first electrode to apply a signal to the micro LED.

Meanwhile, although the thin film transistor (TFT) is a bottom gate type thin film transistor in the drawing, the present disclosure is not limited to the thin film transistor having such a specific structure, but a thin film transistor having various structures such as a top gate type transistor may be applied.

The pad 152 arranged in the pad area may be formed of a metal such as Cr, Mo, Ta, Cu, Ti, Al, an Al alloy, or an alloy thereof. At this time, the pad 152 may be formed by a different process from the gate electrode 101 of the thin film transistor (TFT), but in order to simplify the process, the pad 152 may be formed in the same process as the gate electrode 101.

Although not shown in the figure, the pad may be formed on the gate insulating layer 112. At this time, the pad may be formed by a different process from the source electrode 105 and the drain electrode 107 of the thin film transistor (TFT), but in order to simplify the process, the pad may be formed in the same process as the source electrode 105 and the drawn electrode 107.

In addition, a second electrode 109 is formed on the gate insulating layer 114 in the display area. At this time, the second electrode 109 may be formed of a metal such as Cr, Mo, Ta, Cu, Ti, Al, an Al alloy, or an alloy thereof. It can be formed by the process the same as that of the first electrode 107 (e.g., the drain electrode of the thin film transistor).

A first insulating layer 114 is formed on the substrate 110 on which the thin film transistor TFT is formed and the first micro LED 140 is arranged on the first insulating layer 114 in the display area. At this time, in the drawings, a part of the first insulating layer 114 is removed and the first micro LED 140 is arranged in the removed area, but the first insulating layer 114 may not be removed. The first insulating layer 114 may be composed of an organic layer, such as photo-acryl, and may be composed of a combination of one or more inorganic layers and one or more organic layers, e.g., an inorganic layer/an organic layer, and an inorganic layer/an organic layer/an inorganic layer.

The first micro LED 140 may generally use a group III-V nitride semiconductor material, but is not limited thereto.

Figure 4:
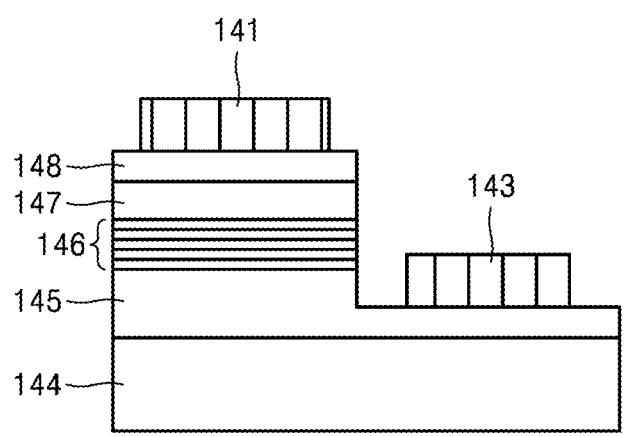
FIG. 4 is a cross-sectional view illustrating an example structure of the micro LED shown in FIG. 3.

FIG. 4 is a view illustrating a structure of a micro LED 140 of a micro LED display device in accordance with an example embodiment of the present disclosure. As shown in FIG. 4, the micro LED 140 according to an example embodiment of the present disclosure is composed of an undoped GaN layer 144, an n-type GaN layer 145 arranged on the GaN layer 144, an active layer 146 having a multi-quantum well (MQW) structure arranged on the n-type GaN layer 145, a p-type GaN layer 147 arranged on the active layer 146, an ohmic contact layer 148 which is formed as a transparent conductive material and arranged on the p-type GaN layer 147, a p-type electrode 141 that is in contact with a part of the ohmic contact layer 148, and a n-type electrode 143 which is in contact with a part of the n-type GaN layer 145 that is exposed by etching the part of the active layer 146, the p-type GaN layer 147, and the ohmic contact layer 148.

The n-type GaN layer 145 is a layer for supplying an electron to the active layer 146. It is formed by doping the n-type impurities, such as Si, into the GaN semiconductor layer.

The active layer 146 is a layer in which the injected electrons and holes are combined to emit light. Although not shown in the figure, the multiple quantum well structure of the active layer 146 includes a plurality of barrier layers and well layers alternately arranged, with the well layer is composed of an InGaN layer and the barrier layer is composed of GaN, but embodiments are not limited thereto.

The p-type GaN layer 147 is a layer for injecting the holes into the active layer 146, and it is formed doped with p-type impurities such as Mg, Zn, and Be.

The ohmic contact layer 148 is to ohmically contact the p-type GaN layer 147 and the p-type electrode 141. Transparent metal oxides, such as ITO (Indium Tin Oxide), IGZO (Indium Galium Zinc Oxide), and IZO (Indium Zinc Oxide), can be used.

The p-type electrode 141 and the n-type electrode 143 may be composed of a single layer or a plurality of layers made of at least one metal of Ni, Au, Pt, Ti, Al, or an alloy thereof.

In such a structure, as the voltage is applied to the p-type electrode 141 and the n-type electrode 143 in the micro LED 140, each electron and hole is injected from the n-type GaN layer 145 and the p-type GaN layer 147 respectively to the active layer 146. An exciton is generated within the active layer 146, and as the extions decay, the light corresponding the energy difference between LUMO (Lowest Unoccupied Molecular Orbital) and HOMO (Highest Occupied Molecular Orbital) of the luminescent layer is generated and emitted to the outside.

At this time, a wavelength of the light luminescent from the micro LED 140 can be adjusted by adjusting a thickness of the barrier layer of the multiple quantum well structure of the active layer.

The micro LED 140 may be formed in a size of about 10-100 μm. Although not shown in the drawing, the micro LED 140 is manufactured by forming a buffer layer on a substrate and growing a GaN thin film on the buffer layer. At this time, sapphire, silicon, GaN, silicon carbide (SiC), gallium arsenide (GaAs), zinc oxide (ZnO), etc., can be used as a substrate for growing the GaN thin film.

In addition, when the substrate for growing a GaN thin film is composed of material other than a GaN, and it is to prevent the quality degradation due to a lattice mismatch generated when directly growing a n-type GaN layer 145 which is an Epi layer on the substrate, AlN or GaN, etc., may be used.

The n-type GaN layer 145 may be formed by growing a GaN layer 144 not doped with the impurities and then doping an n-type impurity, such as Si, on an upper part of the thin film that is not doped. In addition, the p-type GaN layer 147 can be formed by growing an GaN thin film that is not doped and then doping the p-type impurities, such as Mg, Zn, and Be.

Although the micro LED 140 having a specific structure is arranged on the first insulating layer 114 in the drawings, the present disclosure is not limited to the micro LED 140 having such a specific structure. The micro LEDs in various structures, such as a vertically structured micro LED and a horizontally structured micro LED, can be applied.

With reference again to FIG. 3, a second insulating layer 116 is formed on the first insulating layer 114 on which the first micro LED 140 is mounted. At this time, the second insulating layer 116 may be formed of an organic layer, such as photo-acryl, an inorganic layer/an organic layer, or an inorganic layer/an organic layer/an inorganic layer, and covers an upper area of the micro LED 140.

A first contact hole 114a and a second contact hole 114b are formed, respectively, in the first insulating layer 114 and the second insulating layer 116 in an upper part of the second electrode 109 and the thin film transistor TFT, and the drain electrode 107 and the second electrode 109 of the thin film transistor TFT are exposed to the outside, respectively. In addition, a third contact hole 116a and a fourth contact hole 116b are formed, respectively, in the second insulating layer in an upper part of the p-type electrode 141 and the n-type electrode 143 of the first micro LED 140, and the p-type electrode 141 and the n-type electrode 143 are exposed to the outside.

A first connection electrode 117a and a second connection electrode 117b composed of a transparent metal oxide, such as ITO, IGZO, or IGO, are formed in an upper part of the second insulation layer 116. The drain electrode 107 of the thin film transistor TFT and the p-type electrode 141 of the micro LED 140 are electrically connected by the first contact hole 114a and the third electrode 117a through the first contact hole 114a and the third contact hole 116a. The second electrode 109 and the n-type electrode 143 of the first micro LED 140 are electrically connected by the second connection electrode 117b through the second contact hole 114b and the fourth contact hole 116b.

In addition, a buffer layer 118 composed of an inorganic material and/or an organic material is formed in an upper surface of the substrate 110 to cover the micro LED 140.

As described above, in an example embodiment of the present disclosure, when the first micro LED 140 and the second micro LED 142 are provided in the pixel area P and a defect is generated in the first micro LED 140 in the pixel area P, the image degradation due to the defect of the first micro LED 140 can be prevented by not applying the signal to the first micro LED 140 and by instead applying the signal to the second micro LED 142 such that the second micro LED 142 is luminescent.

At this time, the timing controlling unit 180 outputs a gate control signal including information on the pixel area P in which a defect is generated, to the gate driving unit 170. The gate driving unit 170 applies the gate signal to the redundancy gate line, instead of the main gate line, with regard to the corresponding pixel area P according to the gate control signal to drive the second micro LED 142 of the corresponding pixel area P. Information on the pixel area P in which a defect is generated can be created in a lookup table and stored in a memory. The timing controlling unit 180 generates a gate control signal based on the look-up table and outputs it to the gate driving unit 170.

Meanwhile, because the second micro LED 142 is a redundancy micro LED that operates only when the first micro LED 140 is defective, it is not used when a defect is not generated in the first micro LED 140. A second micro LED 142 may be arranged in all pixel areas P of the micro LED display panel 100, and various signal wirings and a thin film transistor for driving the second micro LED 142 are also formed. Including this second micro LED 142, which is to be used only in a special case, may be rather costly, and a structure of a pixel area P of the micro LED display panel 100 may increase due to the arrangements of both the micro LEDs 140 and 142.

Furthermore, even if a defect is generated in the first micro LED 140, only a part of the entire pixel area P may be defective. Therefore, only a part of the second micro LED 142 may be driven for overcoming the defect, and the remaining second micro LED 142 is not used. Thus, a usage efficiency of the second micro LED 142 may be very low.

In the present disclosure, the second micro LED 142 may be used not only for the redundancy of the first micro LED 140, but also for other purposes in order to increase the usage efficiency of the second micro LED 142. For example, in the present disclosure, the usage efficiency of the second micro LED 142 may be improved by using the second micro LED 142 to implement the HDR image.

In general, the human eye can distinguish a wide dynamic range of $10^{-5}$-$10^8$ nits or more, but because a general display device may express only hundreds of dynamic ranges, the user may not appreciate the real image as in nature. For example, in an actual natural environment, the brightness range is very wide—from a very dark scene, such as a night sky, to a very bright scene, such as a sunlight—while the very dark scene and the very bright scene are displayed by reducing this range to a smaller dynamic range for a display device that displays it. Thus, there is a limitation in realizing a realistic image.

The HDR image may reduce/minimize the reduction of the dynamic range of the displayed image, thereby realizing the display of an image that is closer to the real image. That is, HDR technology makes a bright area brighter and a dark area darker, thereby extending the range of brightness so that it is closer to the real image that people see with their eyes.

In the present disclosure, an HDR image is realized by using the second micro LED 142. That is, the first micro LED 140 is driven to realize an image, and if it is displayed in a very bright brightness and the extension in the dynamic range is needed, the first micro LED 140 and the second micro LED 142 are simultaneously driven in the corresponding area. As such, by driving the first micro LED 140 and the second micro LED 142 simultaneously, it may be possible to display the image at two times the brightness which can be expressed by using only the first micro LED 140. Thus, it may be possible to realize an image that is more similar to the real image.

Hereinafter, an example method of realizing the HDR image using the second micro LED 142 will be described in detail.

With reference again to FIG. 1, the panel driving unit of the micro LED display device 150 includes a gate driving unit 170, a data driving unit 174, a timing controlling unit 180, and an image processing unit 190.

The timing controlling unit 180 generates a gate control signal GCS and a data control signal DCS according to a control signal CNT input from an external system (not shown). The gate control signal GCS includes a gate start pulse GSP, a gate shift clock GSC, and an output enable signal GOE, etc., and is supplied to the gate driving unit 170. The data control signal DCS includes a source start pulse SSP, a source sampling clock SSC, an output enable signal SOE, a polarity control signal POL, etc., and is supplied to the data driving unit 174.

At this time, the gate control signal GCS output from the timing controlling unit 180 is generated according to DR area information input from the image processing unit 190, and a control signal for driving the second micro LED 142 is included in the gate control signal GCS.

The information processing unit 190 analyzes an image input from the external system to distinguish whether the image is a HDR image or a SDR image, and then analyzes the HDR image and the SDR image to set an extended area of the dynamic range, and supplies set information to the timing controlling unit 180. For example, the image processing unit 190 analyzes the HDR image by the tone mapping and the color mapping, and calculates the weight of the SDR image to set an extended area of the dynamic range.

Figure 5:
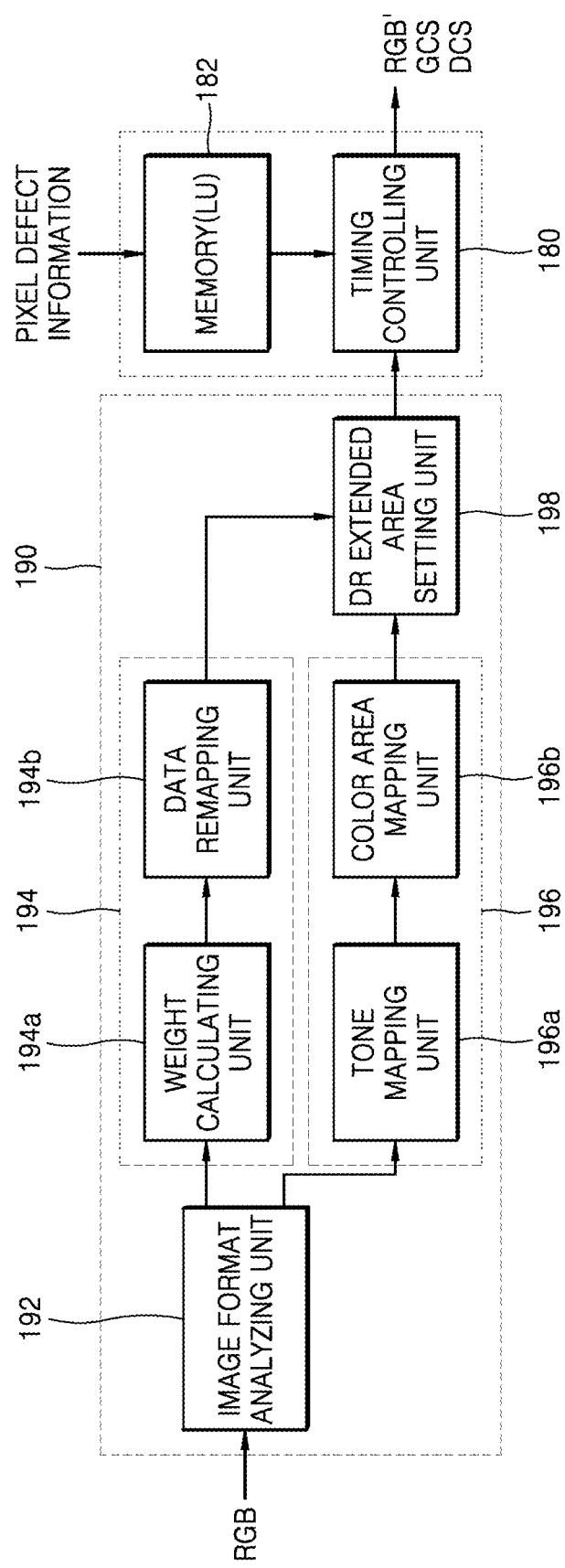
FIG. 5 is a block diagram illustrating a structure of an image processing unit of a micro LED display device in accordance with an example embodiment of the present disclosure.

FIG. 5 is a block diagram illustrating a structure of an information processing unit 190 of the micro LED display device 150 in accordance with an example embodiment of the present disclosure.

As shown in FIG. 5, the image processing unit 190 is composed of an image format analyzing unit 192, a SDR image analyzing unit 194, a HDR image analyzing unit 196, and a dynamic range extended area setting unit 198.

The image format analyzing unit 192 analyzes the format of an image (RGB) input from an external system and classifies whether the input image is a HDR image or a SDR image. The image format analyzing unit 192 may extract a high brightness data of the input image and compare it with the set brightness data to classify the image format. In addition, the image format analyzing unit 192 may generate a histogram of an input image and classify the image format by analyzing the generated histogram.

Figure 6A:
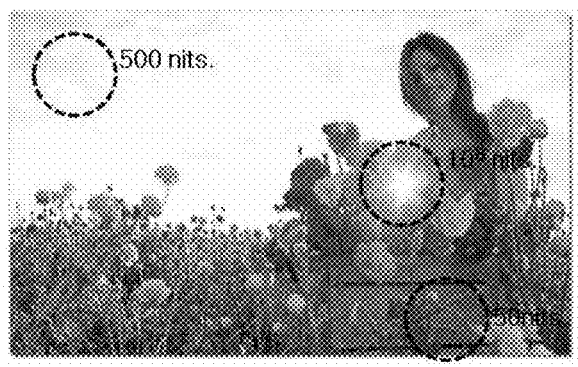
FIGS. 6A and 6B are views illustrating a real image in nature and a SDR (Standard Dynamic Range) image, respectively.
Figure 6B:
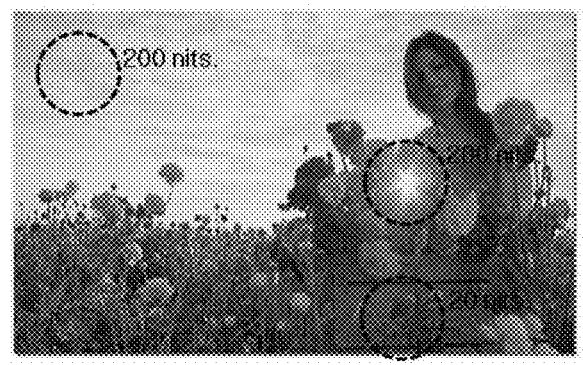
Figure 7A:
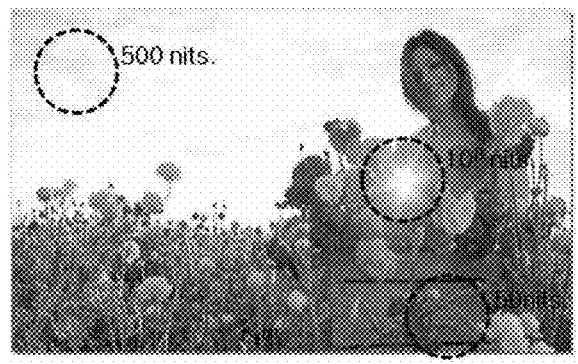
FIGS. 7A and 7B are views illustrating a real image in nature and a HDR (High Dynamic Range) image, respectively.
Figure 7B:
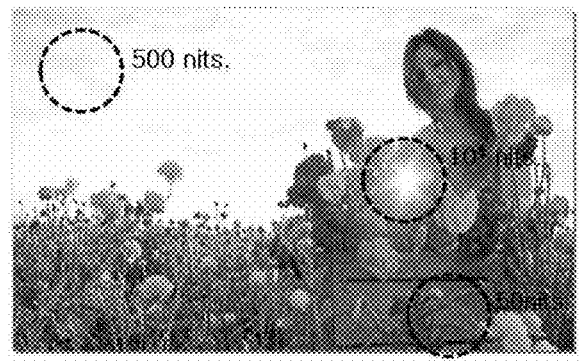

FIGS. 6A-6B are views illustrating a real image in nature that is converted to a SDR image and displayed in the display device. FIG. 6A is a real image in nature, and FIG. 6B is a SDR image input by the display device. In addition, FIGS. 7A-7B are views illustrating a real image in nature that is converted to an HDR image and displayed to the display device. FIG. 7A is a real image in nature, and FIG. 7B is a HDR image input by the display device.

As shown in FIGS. 6A and 7A, in a natural environment, because the range of the brightness is very wide—from a very dark scene such as a night sky to a very bright scene such as a sunlight—the brightness of the area in which the sunlight is directed is much higher, for example, at about $10^8$ nits, than other areas.

As shown in FIG. 6B, when the real object is changed to an image signal through photographing, etc. in order to express the real object in nature to the image of the display device, the brightness of $10^8$ nits is displayed as 200 nits in the SDR image, and thus, the brightness is significantly reduced compared to the real image. On the other hand, as shown in FIG. 7B, the brightness of $10^8$ nits is represented by $10^4$ nits in the HDR image, and the maximum brightness of the actual real image is reduced only by half.

The image format analyzing unit 192 analyzes the maximum brightness of the SDR image (about 200 nits) and the maximum brightness of the HDR image (about $10^4$ nits) to determine whether the image input from the external system is a SDR image or a HDR image, or the histogram of the SDR image and the histogram of the HDR image are analyzed to determine whether the image input from the external system is the SDR image or the HDR image.

When the image is a SDR image, the image format analyzing unit 192 outputs the corresponding image to the SDR image analyzing unit 194, and when the image is a HDR image, it outputs the corresponding image to the HDR image analyzing unit 196.

The SDR image analyzing unit 194 analyzes the frame of the SDR image input. The SDR image analyzing unit 194 may include a weight calculating unit 194a and a data remapping unit 194b.

The weight calculating unit 194a analyzes the weight of the SDR image by a histogram analysis and a mask filtering. The weight calculating unit 194a analyzes the brightness component of the input SDR image and generates a histogram. At this time, the weight calculating unit 194a divides the brightness component into the gradation level units and counts the brightness components corresponding to the respective gradation levels, thereby generating a histogram consisting of a frequency (or a ratio) for each gradation level.

In addition, the weight calculating unit 194a filters an image displayed on the micro LED display device using a mask filter. At this time, a moving mask filter can be used as a mask filter.

The weight calculating unit 194a calculates the weight of each area of the image using the changed histogram and the filtered data.

The data remapping unit 194b remaps the changed histogram and the filtered data, which are changed by the weight calculating unit 194a, to convert the SDR image into an image more similar to a real image. At this time, the data remapping unit 194b changes the SDR image using the calculated weight such that it is close to the real image.

The HDR image analyzing unit 196 analyzes a frame of an input HDR image. The HDR image analyzing unit 196 may be composed of a tone mapping unit 196a and a gamut mapping (color area mapping) unit 196b.

The tone mapping unit 196a compresses the dynamic range of the input HDR image and expresses it in a display device. The HDR image may be an image having the dynamic range closest to the real image perceived by a person, and thus may not be displayed on an actual display device. Accordingly, in order to display the HDR image through the display device, the dynamic range of the HDR image must be compressed to a dynamic range displayable in a display device through the tone mapping process.

The tone mapping unit 196a may compress the HDR image by a global tone mapping or a local tone mapping. The global tone mapping compresses the dynamic range by applying the same function to all pixels of the input HDR image. The local tone mapping considers a surrounding area of the processed pixel and applies other function with regard to each pixel to compress the dynamic range. In addition, the tone mapping unit 196a may compress the HDR image by a tone mapping algorithm using a gamma correction. The local gamma correction calculates a weight map according to a background brightness in consideration of the brightness difference between the pixel to be processed and the surrounding area, and applies it the gamma correction of the tone mapping.

The gamut mapping unit 196b performs gamut mapping on the HDR image compressed in the tone mapping unit 196a. Because the HDR image may be an image having the gamut closest to the real image that human eyes can perceive, the gamut is very wide. When such a HDR image is displayed by an actual display device, because the gamut of the display device is narrower than the gamut of the HDR image, some colors of the HDR image are disposed outside the gamut of the display device, and it may not be possible to realize a wanted color in the display device.

The gamut mapping unit 196b disposes a color, which is disposed outside the gamut of the display device, inside the gamut through the gamut mapping process to realize a color similar to the real image. Such gamut mapping can be accomplished by a variety of methods such as a gamut clipping, a gamut compression, a linear compression, and a non-linear compression.

The DR extended area setting unit 198 sets an area to be extended of the dynamic range of the remapped SDR image and the compressed HDR image.

For the SDR image, the DR extended area setting unit 198 detects an area of brightness which is not displayable in an actual display device among the data of the remapped image, and sets it to a dynamic range extended area.

For the HDR image, the DR extended area setting unit 198 analyzes the data reduced with the dynamic range by a tone mapping of the tone mapping unit 196a and calculates an area which is not compressed in a range of the dynamic range (a set range) which is displayable in the display device. In general, the dynamic range of the most areas is reduced within a set range by a tone mapping. However, with regard to a specific area, for example, an area where the brightness is unusually high compared to other areas, such as areas where direct sunlight is displayed in FIGS. 6A and 7A, the dynamic range is not reduced within the set range. In the DR extended area setting unit 198, an area in which the dynamic range is not reduced within the setting range is set to the dynamic range extended area.

In addition, the DR extended area setting unit 198 analyzes the mapped color area of the gamut mapping unit 196b to calculate an area needed for a color compensation. The color disposed outside the gamut is disposed inside the gamut of the display device due to the gamut mapping. However, the color disposed at the outermost part of the gamut of the real image of the real object and the color in which the brightness is displayed extremely high are still not disposed within a gamut in the display device despite the gamut mapping.

In the DR extended area setting unit 198, an area in which colors that are not disposed in the gamut of the display device among the HDR images subjected to gamut mapping are realized, is set as a dynamic range extended area.

The DR extended area setting unit 198 outputs the set DR extended area information to the timing controlling unit 180. The timing controlling unit 180 generates a gate control signal GCS and a data control signal DCS according to a control signal CNT input from an external system (not shown), and supplies it to the gate driving unit 170 and the data driving unit 174. At this time, the timing controlling unit 180 determines the pixel area P corresponding to the DR extended area based on the DR extended area information input from the DR extended area setting unit 198, and then, generates and outputs the gate control signal GCS and the data control signal DCS.

The gate control signal GCS and the data control signal DCS are control signals for driving the first micro LED 140 disposed in the pixel area P of the micro LED display panel 100. The gate driving unit 170 supplies the gate signal through the gate line according to the gate control signal GCS and the data control signal DCS to drive the thin film transistor TFT arranged in the pixel area P. The data driving unit 174 supplies the image data through the data line to drive the first micro LED 140.

In addition, the gate control signal GCS and the data control signal DCS include a control signal for driving the second micro LED 142 disposed in the pixel area P of the DR extended area of the micro LED display panel 100. According to the gate control signal GCS, the gate driving unit 170 drives the redundancy thin film transistor TFT disposed in the pixel area P of the DR extended area through the redundancy gate line corresponding to the DR extended area, and the data driving unit 174 supplies the image data modulated in the pixel area P of the DR extended area through the redundancy data line corresponding to the DR extended area to drive the second micro LED 142.

In other words, in an area which is not the DR extended area, it outputs the image data RGB' modulated according to the result analyzed by the SDR image analyzing unit 194 and the HDR image analyzing unit 196, and drives only the first micro LED 140 to realize an image. In a DR extended area, it outputs the image data RGB' modulated according to the result analyzed by the DR image analyzing unit 194 and the HDR image analyzing unit 196, and drives both the first micro LED 140 and the second micro LED 142 to realize an image.

In addition, the timing controlling unit 180 may generate only the gate control signal (GCS) including DR extended area information. That is, a gate signal for driving only the redundancy thin film transistor TFT of the pixel area P of the DR extended area is output to the redundancy gate line corresponding to the DR extended area according to the gate control signal GCS, and only the second micro LED 142 of this area may be driven. In this case, the modulated image data is applied to the entire redundancy data line, but only the redundancy thin film transistor TFT of the DR extended area is turned on, so that only the second micro LED 142 of this area is driven.

As such, in the present disclosure, because two micro LEDs 140 and 142 are simultaneously driven in the pixel area P of the DR extended area, the brightness of the DR extended area can be improved by two times as compared to that of the other area. In addition, because the brightness of the DR extended area can be increased, the contrast ratio of the SDR image and the HDR image can be improved. Therefore, the qualities of the SDR image and the HDR image can be greatly improved.

Figure 8A:
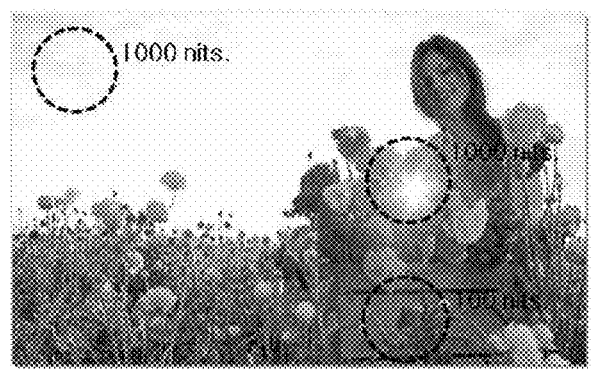
FIGS. 8A and 8B are views illustrating a HDR image displayed in a micro LED display device having a general structure and a HDR image displayed in a micro LED display device in accordance with an example embodiment of the present disclosure, respectively.

As shown in FIG. 8A, only the first micro LED 140 is driven to display an image over the entire micro LED display panel 100 having a general structure, so that both the sky image and the image in which direct sunlight appears are displayed in 1000 nits which is the limitation of the brightness of the micro LED display device.

Figure 8B:
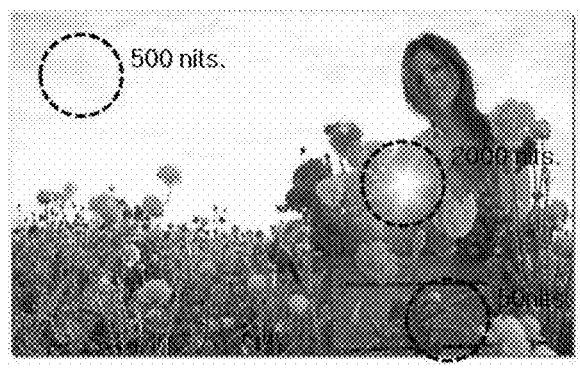

Meanwhile, as shown in FIG. 8B, in the present disclosure, because both the first micro LED 140 and the second micro LED 142 are driven in the DR extended area, it may display the brightness of the image of the sky in 500 nits (or 1000 nits) and increase the brightness of the image displayed by the direct sunlight to 2000 nits. Accordingly, the micro LED display device according to the present disclosure can realize an image closer to the real image of the object, compared to the micro LED display device having a general structure.

Meanwhile, in the present disclosure, as the first micro LED 140 and the second micro LED 142 are driven in the DR extended area, the device not only displays the brightness at two times the maximum brightness of the micro LED display device having the general structure, but is also able to realize the image of various brightness (various brightness more than the maximum brightness of 1000 nits which can be realized in the first micro LED 140) having an increased contrast ratio, which cannot be realized in the micro LED display device having the general structure, by controlling an intensity of the signal (e.g., a current) applied to the first micro LED 140 and the second micro LED 142 and controlling the brightness of the light which is luminescent in the first micro LED 140 and the second micro LED 142.

Meanwhile, the micro LED display device according to the present disclosure includes a memory 182 in which a lookup table (LU) including pixel defect information is stored. The timing controlling unit 180 refers to information of a lookup table (LU) and generates the gate control signal GCS and the data signal DCS. That is, in the defective pixel area, a signal is not applied to the first micro LED 140. Instead, a signal is applied to only the second micro LED 142 to drive the second micro LED 142 instead of the first micro LED 140.

Hereinafter, a method of driving a micro LED display device according to the present disclosure will be described with reference to the accompanying drawings.

Figure 9:
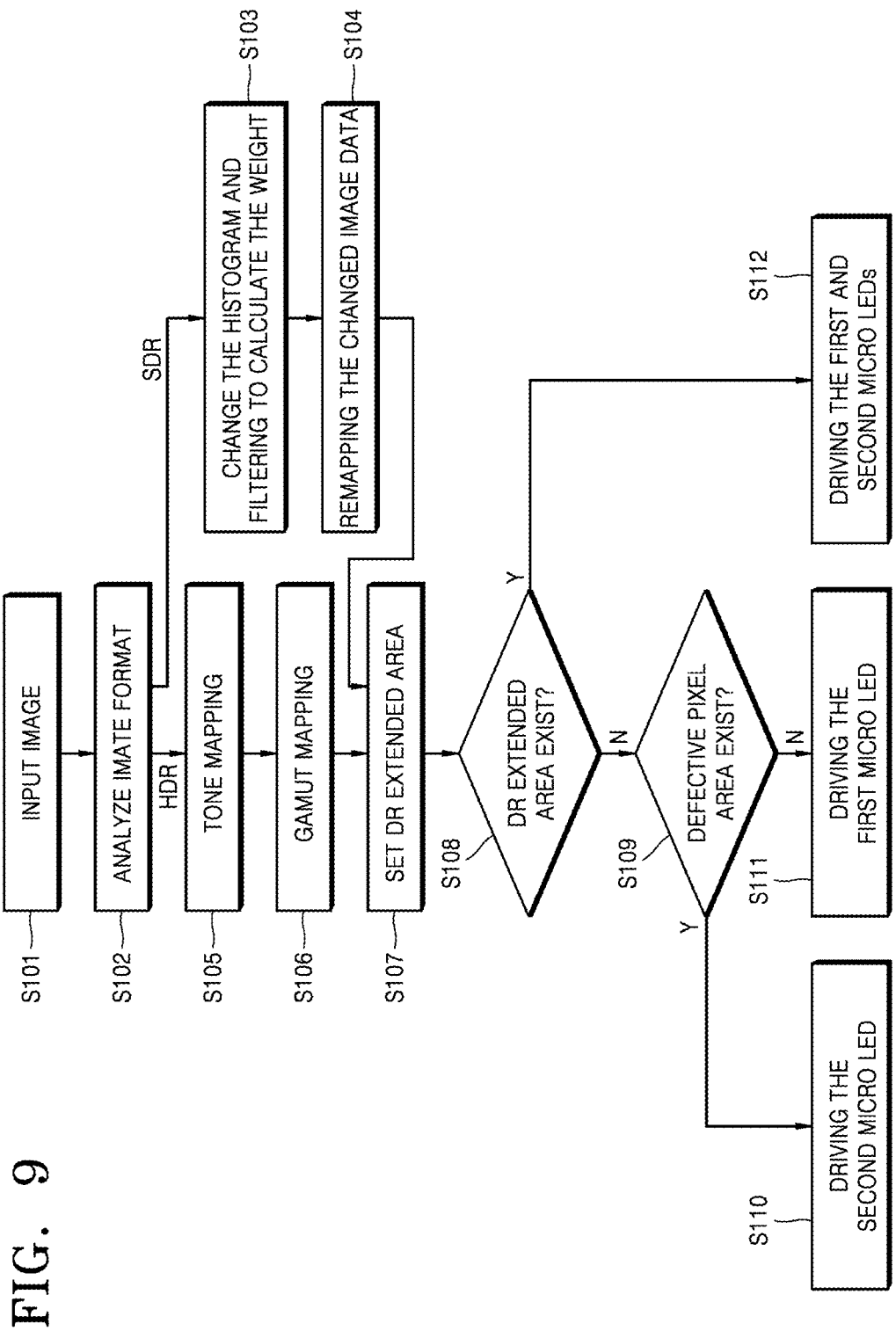
FIG. 9 is a flow chart illustrating a driving method of a micro LED display device in accordance with an example embodiment of the present disclosure.

FIG. 9 is a view illustrating a method of driving a micro LED display device according to an example embodiment of the present disclosure.

As shown in FIG. 9, first, when image data RGB is input from an external system (S101), the format of the corresponding image data is analyzed to determine whether the image is a HDR image or a SDR image (S102).

If the image is a SDR image, a histogram of the SDR image is generated, the histogram is changed by a mapping function, and the SDR image is filtered by a filter, such as a moving mask filter, to calculate a weight of the image data (S103).

Then, the modified histogram and the filtered data are remapped to convert the SDR image into an image more similar to the image of the real object (S104).

If the image is an HDR image, the HDR image is tone-mapped to compress the dynamic range of the HDR image to a dynamic range displayable in the display device (S105).

Thereafter, the HDR image is gamut-mapped so that the color disposed outside the gamut of the image that can be displayed by the display device is disposed inside the gamut (S106).

Then, the area displayed with the image of the brightness which is not displayable in the display device is detected in the remapped image data of the SDR image. The area having the dynamic range which is not displayable in the display device is detected among the area reduced with the dynamic range by the tone mapping of the HDR image. The area which is not disposed within the gamut of the display device is detected among the gamuts by the gamut mapping, and these areas are set to the dynamic range extended area (S107).

Thereafter, if there is no DR extended area in the HDR image or the SDR image (S108), and if there is no defective pixel area in the micro LED display panel (S109), the first micro LED 140, which is the main luminescent micro LED, is driven to display the image (S111).

If there is a defective pixel area in the micro LED display panel (S109), the second micro LED 142, which is a redundancy micro LED, is driven instead of the main luminescent micro LED 140 in the corresponding pixel area (S110). At this time, the driving of the total first micro LED 140R, 140G, 140B of the pixel area may be stopped, and the second micro LED 142R, 142G, 142B may be driven instead. Alternatively, the driving of the micro LED in which the defect is generated (for example, R of the first micro LED 140R) among the three of the first micro LEDs 140R, 140G, 140B of the pixel area may be stopped, and only the second micro LED of the corresponding color (for example, R of the second micro LED 142R) may be driven. In this case, because the first micro LED 140R, in which the defect is generated, is not luminescent, the corresponding second micro LED 142R can be driven without stopping the separate driving.

When the DR extended area exists in the HDR image or the SDR image, the first micro LED 140 in the pixel area of the corresponding area is driven, and the second micro LED 142 is further driven to display an image close to the real image (S112).

According to an example embodiment of the present disclosure, a method for driving a micro LED display device includes analyzing an image input to a first micro LED and a second micro LED which are arranged at a plurality of pixel areas, respectively; setting an extended area of a dynamic range of the image; and simultaneously driving the first micro LED and the second micro LED in the pixel areas of the extended area of the dynamic range and driving the first micro LED in the pixel areas of other area.

The method may further include generating a histogram of the SDR image, changing the histogram, filtering the SDR image, and calculating a weight of an image data, when the image is a SDR image; and remapping a changed histogram and a filtered data.

The setting the extended area of the dynamic range of the image may include detecting an area of a brightness which is not displayable in an actual display device among a remapped image data of the SDR image.

The method may further include tone mapping the HDR image in case where the image is an HDR image; and gamut mapping the HDR image.

Setting the extended area of the dynamic range of the image may include detecting an area having a dynamic range which is not displayable in a display device among the areas reduced with the dynamic range by a tone mapping of the HDR image, and an area which is not disposed in the gamut of the display device among the gamut by the gamut mapping.

The method may further include generating a histogram of the SDR image, changing the histogram, filtering the SDR image, and calculating a weight of the image data, in case where the image is a SDR image; remapping a changed histogram and a filtered data; tone mapping the HDR image in case where the image is a HDR image; and gamut mapping the HDR image.

Setting the extended area of the dynamic range of the image may include detecting an area with an image of the brightness which is not displayable in the actual display device among the remapped image data of the SDR image and detecting an area having a dynamic range which is not displayable in the display device among the area reduced with the dynamic range by a tone mapping of the HDR image, and an area which is not disposed in the gamut of the display device among the gamuts by a gamut mapping.

The method may further include driving only the second micro LED in the corresponding pixel area when a defective pixel area exists in a micro LED display panel.

It will be apparent to those skilled in the art that various modifications and variations can be made in the present disclosure without departing from the spirit or scope of the disclosure. Thus, it is intended that the present disclosure covers the modifications and variations of this disclosure provided they come within the scope of the appended claims and their equivalents.

What is claimed is:

1. A micro light-emitting diode (LED) display device, comprising:
   a display panel including a plurality of pixel areas each having a thin film transistor; and a first micro light-emitting diode and a second micro light-emitting diode in each pixel area, wherein the first micro light-emitting diode is configured to emit light to display an image; and the second micro light-emitting diode is configured to emit light to improve a displayed brightness for a specific area of the image, and wherein the micro light-emitting diode display device is configured to:

receive an input image for display by the display panel;

analyze the input image to determine whether the input image is a high dynamic range (HDR) image or a standard dynamic range (SDR) image; and if the input image is analyzed to be an HDR image:

compress the dynamic range of the HDR image to a dynamic range that is displayable by the micro light-emitting display device, gamut map the HDR image such that colors of the HDR image outside of a color gamut of the display panel are disposed inside the color gamut of the display panel, and drive the first micro light-emitting diodes and the second micro light-emitting diodes simultaneously in a dynamic range extended area corresponding to an area of the HDR image having colors that cannot be disposed inside the color gamut of the display panel.

2. The micro light-emitting diode display device of claim 1, wherein the micro light-emitting diode has a size of 10-100 μm.

3. The micro light-emitting diode display device of claim 1, wherein the first micro light-emitting diode and the second micro light-emitting diode are driven together to display an extended area of a dynamic range of the image corresponding to the specific area of the image.

4. The micro light-emitting diode display device of claim 3, wherein the extended area of the dynamic range is configured to be displayed at a brightness of 1-2 times a maximum brightness displayed for other areas of the image.

5. The micro light-emitting diode display device of claim 1, further comprising a memory that stores information about a defective pixel.

6. The micro light-emitting diode display device of claim 1, wherein the second micro light-emitting diode is driven based on the first micro light-emitting diode being defective.

7. A display device, comprising:

a display panel including a plurality of pixel areas, wherein each pixel area includes a first light-emitting diode and a second light-emitting diode, and wherein the display device is configured to drive the second light-emitting diode to emit light based on the first light-emitting diode being defective, and wherein the display device is configured to:

receive an input image for display by the display panel;

analyze the input image to determine whether the input image is a high dynamic range (HDR) image or a standard dynamic range (SDR) image; and if the input image is analyzed to be an HDR image:

compress the dynamic range of the HDR image to a dynamic range that is displayable by the display device, gamut map the HDR image such that colors of the HDR image outside of a color gamut of the display panel are disposed inside the color gamut of the display panel, and drive the first light-emitting diodes and the second light-emitting diodes simultaneously in a dynamic range extended area corresponding to an area of the HDR image having colors that cannot be disposed inside the color gamut of the display panel.

8. The display device of claim 7, wherein the display device is configured to:

receive the input image for display by the display panel, and analyze the input image to determine whether the input image includes an area of brightness that is not displayable by only the first light-emitting diodes of the display panel; and drive the first light-emitting diodes and the second light-emitting diodes simultaneously in a dynamic range extended area corresponding to the area of brightness.

9. The display device of claim 8, wherein the display device is configured to drive only the first light-emitting diodes in an area other than the dynamic range extended area.

10. The display device of claim 7, wherein:

the first light-emitting diode is composed of red, green, and blue micro light-emitting diodes; and the second light-emitting diode is composed of red, green, and blue micro light-emitting diodes.

11. The display device of claim 7, wherein:

based on the first light-emitting diode being determined to be defective, the display device is configured to drive only the second light-emitting diode in the corresponding pixel area.

12. The display device of claim 8, wherein:

the display device is configured to drive only the first light-emitting diodes among the first and second light-emitting diodes in an area of the display panel based on the first light-emitting diodes being determined not defective and on the area being determined not to include a dynamic range extended area.

\* \* \* \* \*